United States Patent
Cheikh et al.

(10) Patent No.: US 12,183,182 B2
(45) Date of Patent: Dec. 31, 2024

(54) METHOD FOR SCANNING FOR PRESENCE INSIDE A LOCKED VEHICLE, ASSOCIATED DEVICE AND SCANNING SYSTEM

(71) Applicant: Continental Automotive GmbH, Hannover (DE)

(72) Inventors: Mohamed Cheikh, Toulouse (FR); Alexis Morin, Toulouse (FR)

(73) Assignee: Continental Automotive GmbH, Hannover (DE)

( * ) Notice: Subject to any disclaimer, the term of this patent is extended or adjusted under 35 U.S.C. 154(b) by 83 days.

(21) Appl. No.: 18/137,064

(22) Filed: Apr. 20, 2023

(65) Prior Publication Data
US 2023/0343201 A1 Oct. 26, 2023

(30) Foreign Application Priority Data
Apr. 26, 2022 (FR) ..................................... 2203875

(51) Int. Cl.
*G08B 21/00* (2006.01)
*G08B 21/22* (2006.01)
(Continued)

(52) U.S. Cl.
CPC ............. *G08B 21/22* (2013.01); *G08B 21/24* (2013.01); *H04W 4/029* (2018.02); *H04W 4/80* (2018.02)

(58) Field of Classification Search
CPC ........ G08B 21/22; G08B 21/24; G08B 25/10; H04W 4/029; H04W 4/80; B60R 21/01;
(Continued)

(56) References Cited

U.S. PATENT DOCUMENTS

| 10,074,263 B1* | 9/2018 | Garcia ..................... B60Q 9/00 |
| 2020/0094709 A1* | 3/2020 | Dutkin ..................... B60N 2/28 |

FOREIGN PATENT DOCUMENTS

| EP | 1721793 A1 | 11/2006 |
| GB | 2558589 A | 7/2018 |
| WO | 2022074189 A1 | 4/2022 |

OTHER PUBLICATIONS

French Search Report for French Application No. 2203875, dated Dec. 4, 2022 with translation, 12 pages.

* cited by examiner

*Primary Examiner* — Mark S Rushing
(74) *Attorney, Agent, or Firm* — Buchanan, Ingersoll & Rooney PC

(57) ABSTRACT

A method for scanning for presence inside a vehicle, using a scanning device including at least one internal and one external ultra-wideband transceiver module for locating portable "hands-free" access equipment carried by a user. The device has an Ultra High Frequency communicator for communicating with the equipment. The method includes: a) detecting locking of the vehicle; b) for a predetermined duration: i) scanning for presence inside the vehicle with the internal module; ii) simultaneously transmitting a request to the equipment for detecting a U-turn by the user; iii) if a U-turn signal is received, stopping scanning and determining the position of the user with the two modules; iv) if presence is detected inside the vehicle, stopping scanning and transmitting a warning; c) when the duration has elapsed, if no U-turn signal is received and if no presence is detected, the position of the user is determined with the two modules.

9 Claims, 4 Drawing Sheets

(51) Int. Cl.
*G08B 21/24* (2006.01)
*H04W 4/029* (2018.01)
*H04W 4/80* (2018.01)
(58) Field of Classification Search
CPC ...... B60R 2021/003; B60R 2021/0104; G01C 21/16; G01C 21/18
USPC ....................................................... 340/457
See application file for complete search history.

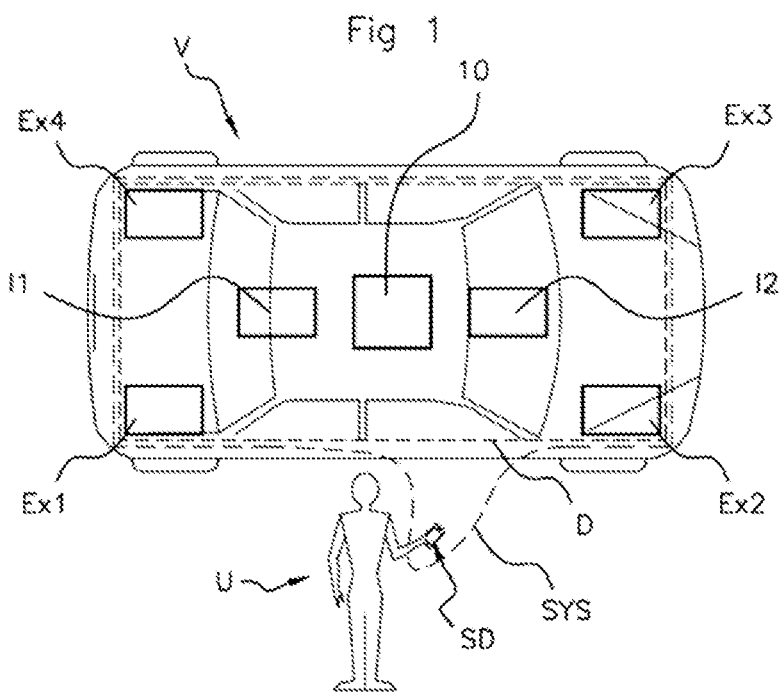
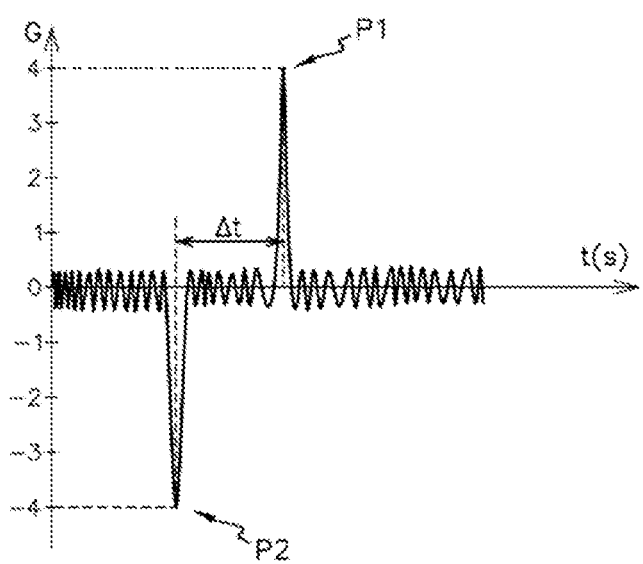

METHOD FOR SCANNING FOR PRESENCE INSIDE A LOCKED VEHICLE, ASSOCIATED DEVICE AND SCANNING SYSTEM

CROSS REFERENCE TO RELATED APPLICATIONS

This application claims priority to French Patent Application No. 2203875, filed Apr. 26, 2022, the contents of such application being incorporated by reference herein.

FIELD OF THE INVENTION

The invention relates to a method for scanning for presence inside a vehicle that has been previously locked, to a scanning device and to an associated system. The invention is particularly applicable for detecting young children, or a baby that may have been left on the rear seats when the driver left and locked the vehicle.

BACKGROUND OF THE INVENTION

New automotive standards are emerging that now require manufacturers to detect a child aged 0-6 years in a vehicle, for a period of 10 seconds after the vehicle is locked, this is the case, for example, for the "Euro NCAP" standard. This standard is broken down into three levels: a first level that triggers the horn and switches on the headlights of the vehicle in the event of detection; a second level that triggers a notification to be sent to the telephone of the driver; and, finally, a third level that triggers an emergency call, i.e., an "e-call" sent by the vehicle.

In order to warn the driver of the presence of a young child or baby on a rear seat of a motor vehicle, several methods or devices of the prior art are known.

Most methods use dedicated sensors, for example, a sensor on the rear seat belt, which detects that the belt is fastened, or infrared or radar sensors for detecting the presence of an "object" on the rear seat, supplemented by the detection of a breathing movement, or else sensors located under the rear seat that detect a weight or even a camera that visualizes the environment near the rear seats.

However, the disadvantages of these dedicated sensors lie in their additional cost to the vehicle and the lack of privacy when using the camera.

It is also known for the sensors that already exist on the vehicle to be used, for example, Ultra-Wide Band (UWB) frequency transceivers, which are located on the vehicle in order to allow "hands-free" access to the vehicle and/or "hands-free" starting of the vehicle. These sensors are then used to detect the breathing movement, i.e., the heart rate, of a human located in the vehicle.

The advantage of using ultra-wide band lies in the frequency of the emitted waves, which allows the waves to penetrate through clothing.

However, if the UWB transceivers are used for scanning or detecting presence inside the vehicle, then they are no longer available for carrying out the "hands-free" access function.

In this case, during the 10 seconds after the user has locked their vehicle, the UWB transceivers are dedicated to scanning for presence inside the vehicle and are not able to locate the user or track their trajectory relative to the vehicle. A priori, a user leaving the vehicle is supposed to move away from the vehicle. However, a problem arises if they perform a U-turn and return to the vehicle because they have forgotten an object or simply to check that they have not forgotten their child.

In this specific case, since the position of the user is not determined by the UWB transceivers, which are busy carrying out the function of scanning for presence inside the vehicle, and which are therefore unavailable for carrying out the "hands-free" access function, when the user wishes to open the vehicle, the door is not unlocked. This is known as the "wall effect", and it lasts for the time needed for the UWB transceivers to scan for presence inside the vehicle, which is at least 10 seconds.

The possible solutions of the prior art involve:
a. granting priority to one of the two functions, but this is not desirable for the convenience of the user, who should not have to choose;
b. using two different ULB frequencies, one frequency at 6.5 MHZ (band 5) for detecting access to the vehicle and one frequency at 8 MHZ (band 9) for detecting presence inside the vehicle, but this solution is not universal, as many countries prohibit the use of two ULB frequency bands (Japan, South Korea, etc.);
c. alternating the operating mode of the transceivers between the two functions, but this increases the time needed to scan for presence inside the vehicle and risks exceeding the permitted 10 seconds.

An aspect of the invention therefore proposes a scanning method, a scanning device and a system that overcome the disadvantages of the prior art, particularly allowing the vehicle to carry out both functions simultaneously, i.e., scanning for presence inside the vehicle, and locating the user around the vehicle for the 10 seconds, once the vehicle is locked. The proposed detection method is particularly relevant for detecting the user performing a U-turn and returning to the vehicle.

SUMMARY OF THE INVENTION

An aspect of the invention relates to a method for scanning for presence inside a vehicle, using a scanning device comprising at least one internal ultra-wideband transceiver module capable of transmitting toward the inside of the vehicle and at least one external ultra-wideband transceiver module capable of transmitting toward the outside of the vehicle, and capable of locating portable "hands-free" access equipment carried by a user, said method being characterized in that the scanning device is previously equipped with Ultra High Frequency communication means for communicating with said equipment and in that the method comprises the following steps:
a. detecting the locking of the vehicle;
b. for a predetermined duration:
c. scanning for presence inside the vehicle using the internal ultra-wideband transceiver module, and comparing a profile of waves reflected and received by said internal module with at least one predetermined wave profile;
d. simultaneously transmitting, via Ultra High Frequency, a request to the portable equipment for detecting a U-turn by the user;
e. if a U-turn signal is received, stopping scanning and determining the position of the user using the internal module and the external module;
f. if presence is detected inside the vehicle, then stopping scanning and transmitting a warning to the user;
g. otherwise, at the end of the predetermined duration, if no U-turn signal is received and if no presence is detected inside the vehicle, then determining the position of the user using the internal module and the external module.

An aspect of the invention also relates to a method for detecting a U-turn of a user, by means of portable "hands-free" vehicle access equipment carried by said user, with said equipment being capable of communicating with the vehicle via Ultra High Frequency, and being equipped with a gyroscope, the method being characterized in that it comprises the following steps:
- a. receiving, via Ultra High Frequency, a U-turn detection request from the vehicle;
- b. detecting the U-turn, by measuring the values of the gyroscope;
- c. said equipment transmitting, if a U-turn is detected, a U-turn signal to the vehicle.

Appropriately, upon receiving a U-turn detection request, an acquisition frequency of the gyroscope values can be increased.

Advantageously, a U-turn is detected when the gyroscope values have a peak maximum value and a peak minimum value within a predetermined time window.

For example, a ratio between the maximum value and the minimum value ranges between 0.7 and 1.3.

According to the scanning method of an aspect of the invention, if presence is detected inside the vehicle, then a signal to stop detecting a U-turn is transmitted to the portable equipment.

The scanning method can further comprise the following steps:
- a. at the same time as scanning, a step of determining a distance between the user and the vehicle that is carried out by the external module;
- b. if a U-turn signal is received, a step of checking that values of said distance represent a U-turn;
- c. scanning is only stopped and determining the position of the user is only carried out using the internal module and the external module if said check is confirmed.

An aspect of the invention also relates to a scanning device intended to be placed on board a motor vehicle comprising at least one internal ultra-wideband transceiver module capable of transmitting toward the inside of the vehicle and at least one external ultra-wideband transceiver module capable of transmitting toward the outside of the vehicle, and capable of locating portable "hands-free" access equipment carried by a user, the device being characterized in that it is equipped with a clock and is capable of:
- a. communicating with said equipment via Ultra High Frequency;
- b. detecting the locking of the vehicle;
- c. scanning for presence inside the vehicle using the internal ultra-wide band wave transceiver module and comparing a profile of waves reflected and received by said module with at least one predetermined wave profile;
- d. simultaneously transmitting a request for detecting a U-turn of the user to said equipment;
- e. as a function of a U-turn signal received from the portable equipment or of the detection of presence inside the vehicle:
- f. stopping scanning; and
- g. determining the position of the user using the internal module and the external module;
- h. transmitting a warning to the user if presence is detected inside the vehicle.

An aspect of the invention also applies to any portable hands-free equipment for accessing a vehicle equipped with a gyroscope and carried by a user, with said equipment being characterized in that it is capable of:
- a. communicating with the vehicle via Ultra High Frequency;
- b. carrying out measurements of the gyroscope values;
- c. detecting whether the gyroscope values represent a U-turn of the user;
- d. transmitting, as a function of the detection of a U-turn, a U-turn signal to the vehicle.

The portable equipment can comprise means for increasing an acquisition frequency for measurements of gyroscope values.

The portable equipment comprises means for determining peak maximum values and peak minimum values of the gyroscope values during a predetermined time window.

The scanning device is, for its part, capable of sending a request to stop the gyroscope measurements to the portable equipment as a function of the detection of presence inside the vehicle.

The scanning device is also capable of:
- a. determining a distance between the user and the vehicle by means of the external module;
- b. checking, as a function of the U-turn signal, that the values of said distance correspond to a U-turn;
- c. stopping scanning and determining the position of the user using the internal and external modules as a function of the result of the check.

An aspect of the invention also relates to any computer program product, comprising program code instructions for executing the steps of the scanning method according to any one of them and/or for executing the detection method according to any one of the aforementioned features when said program is executed on a computer.

An aspect of the invention applies to any system comprising a scanning device as per any portable "hands-free" access equipment according to any one of the aforementioned features.

Finally, an aspect of the invention relates to any motor vehicle comprising a scanning device according to any one of the aforementioned features.

BRIEF DESCRIPTION OF THE DRAWINGS

Further features and advantages of aspects of the invention will become more clearly apparent from the following description. This description is purely illustrative and should be read with reference to the appended drawings, in which:

FIG. 1 schematically shows a motor vehicle comprising a scanning device according to an aspect of the invention;

FIG. 2 is a graph showing the values of the gyroscope of the portable "hands-free" access equipment according to time, illustrating the case of a U-turn, i.e., the user returning to their vehicle, after having left their vehicle;

DETAILED DESCRIPTION OF THE PREFERRED EMBODIMENTS

Figure 6:
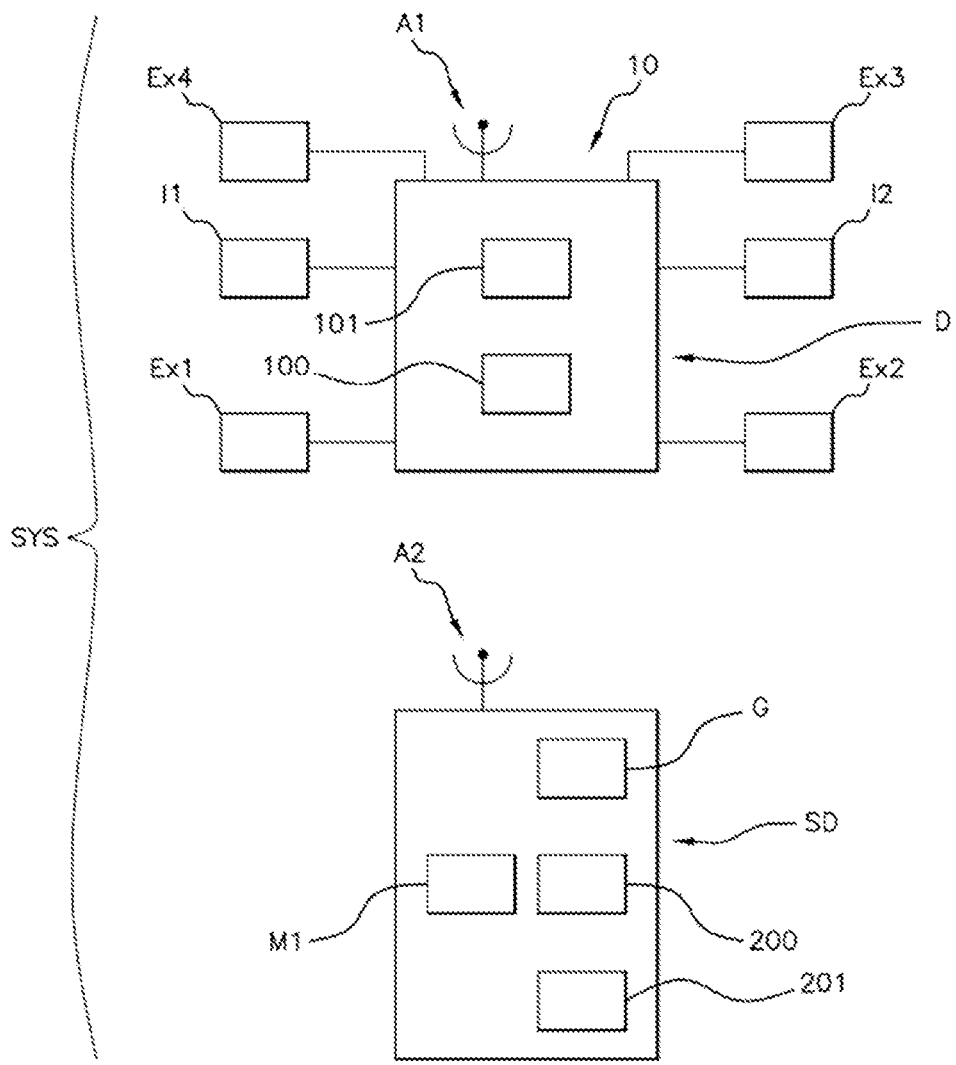
FIG. 6 schematically shows the scanning system according to an aspect of the invention, comprising the scanning device and the portable "hands-free" access equipment.

The scanning system SYS according to an aspect of the invention is illustrated in FIGS. 1 and 6. The scanning system SYS comprises a scanning device D and an item of portable "hands-free" equipment SD for accessing the vehicle V that is carried by the user U.

The scanning device D is on board the motor vehicle V and comprises at least one internal ultra-wide band transceiver module I1 capable of transmitting toward the inside of the vehicle V and at least one external module, in the example two external ultra-wideband transceiver modules Ex1, Ex4 will be considered that are capable of transmitting toward the outside of the vehicle V, and are capable of locating portable "hands-free" access equipment carried by a user. However, an aspect of the invention also operates with a single internal module I1 and a single external module Ex1.

Ultra-Wide Band is understood to be a radio modulation technique that is based on transmitting very short duration pulses, often less than one nanosecond. Thus, the bandwidth can reach very high values.

Ultra-Wide Band transceiver modules each comprise at least one antenna and one electronic unit connected to the antenna and adapted to transmit and receive information via Ultra-Wide Band, as is known in the prior art.

Figure 5:
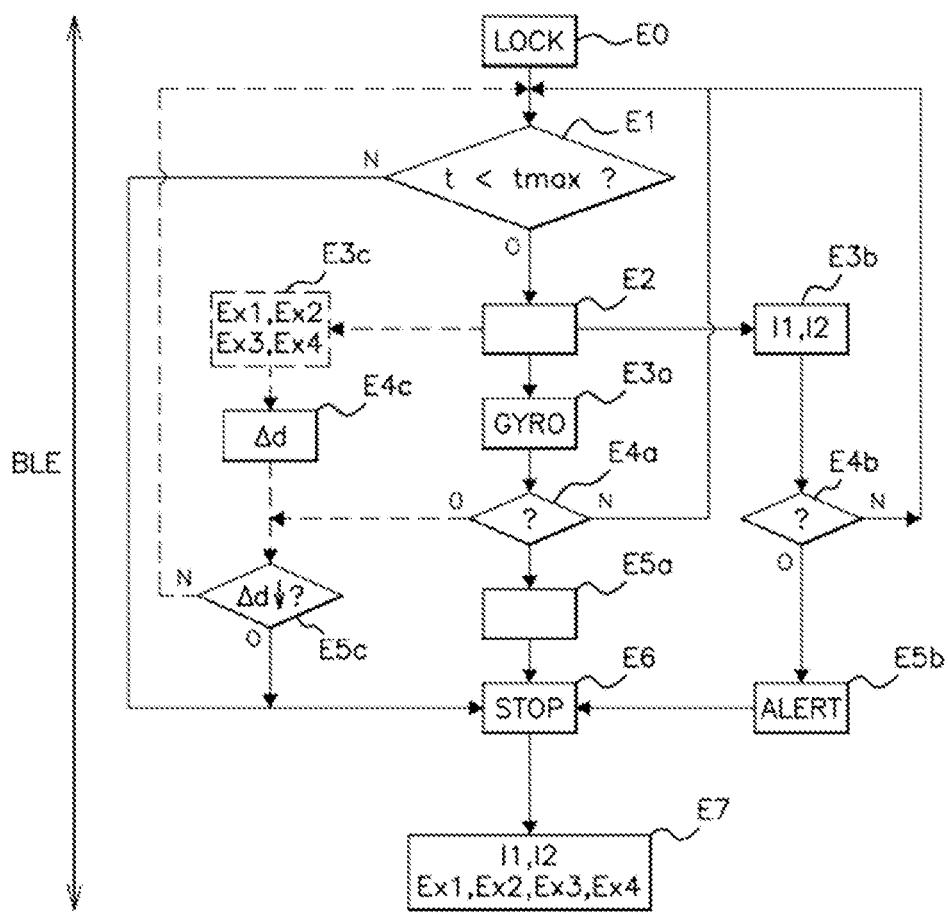
FIG. 5 is a flow chart showing the scanning method according to an aspect of the invention.

FIGS. 1 and 5 illustrate a scanning device comprising two internal modules I1, I2 and four external modules Ex1, Ex2, Ex3, Ex4. Said modules are all connected to a central management unit 10, which receives and processes the information originating from the modules and allows, for example, the portable equipment to be located. The central management unit 10 also allows the transmissions carried out by the modules to be managed.

According to an aspect of the invention, the scanning device D is also equipped with means A1 for communicating with the portable equipment SD via BLE ("Bluetooth Low Energy"), i.e., an antenna A1 and a BLE transceiver unit, for example, integrated in the central management unit 10.

According to an aspect of the invention, the scanning device D is also capable of detecting the locking of the vehicle, to this end it is connected to the vehicle management system, which is, for example, integrated in or connected to the central management unit 10, and can receive a message for locking the vehicle.

The device D can also scan for presence inside the vehicle using at least one internal module I1. More specifically, the internal module I1 transmits ultra-wide band waves, and compares a reflected wave profile that it receives with at least one predetermined wave profile. Several wave profiles may have been determined beforehand, with or without presence in the passenger compartment, and stored in a memory of the central unit 10.

The device D can transmit, by virtue of the BLE communication means, a request to detect a U-turn of the user U to said equipment SD, and in return receive, via BLE communication, a U-turn signal received from the portable equipment SD.

The scanning device SD is also capable of:
i. stopping scanning; and
ii. determining the position of the user U using at least one internal module I1, I2 and at least one external module E1, E4, when it receives a U-turn signal from the portable equipment or if it has detected presence inside the vehicle. It can also transmit a visual or audible warning to the user if presence is detected inside the vehicle, such as triggering the vehicle horn or turning on the turn signals of the vehicle V.

When the vehicle is equipped with only one external module Ex1, and only one internal module I1, the position of the user can only be determined on one side of the vehicle V, for example, on the driver side of the vehicle.

In an improvement of an aspect of the invention, the scanning device SD is also capable of sending the portable equipment SD a request to stop the gyroscope measurements as a function of the detection of presence inside the vehicle.

In a second embodiment of the invention, the scanning device SD is adapted for:
a. determining a distance between the user U and the vehicle V by means of the external module Ex1, Ex2, Ex3, Ex4;
b. checking, as a function of the U-turn signal, that said distance decreases;
c. stopping scanning and determining the position of the user U using the internal I1, I2 and external Ex1, . . . , Ex4 modules as a function of the result of the check.

To this end, the scanning device SD is equipped with software means for carrying out these functions. For this purpose, the central management unit 10 comprises a processor 100 and a memory 101, which stores instructions for configuring the processor to execute particular processing, in particular for implementing the steps of the scanning method according to a particular embodiment and as described hereafter.

As illustrated in FIG. 6, the portable "hands-free" access equipment SD is, for example, a smartphone provided with BLE communication means, i.e., an antenna A2 and a BLE transceiver unit, in order to communicate with the vehicle V, and equipped with a gyroscope G.

According to an aspect of the invention, the portable equipment SD is equipped with software means, a processor 200, a memory 201 allowing it to:
a. receive a U-turn detection request;
b. carry out measurements of the gyroscope values;
c. detect whether the gyroscope values represent a U-turn of the user;
d. transmit, as a function of the detection of a U-turn, a U-turn signal to the vehicle via BLE.

For this purpose, the portable equipment SD comprises means M1 for determining peak maximum values and peak minimum values of the gyroscope values during a predetermined time window $\Delta t$, as described hereafter.

The portable equipment SD can also comprise means for increasing the acquisition frequency of the gyroscope measurements once it has received a U-turn detection request in order to improve the accuracy of U-turn detection.

The scanning method and the U-turn detection method will now be described.

During a first step E0, the scanning device receives information indicating that the vehicle is locked, the central management unit 10 is, for example, connected to the information network of the vehicle, namely a CAN network or other, and receives the information indicating that the doors are locked via this wired network.

Once the vehicle is locked, a timer is triggered, to this end the device has an internal clock. The timer is calibrated for a predetermined duration tmax, for example, of 10 seconds.

During said duration, and as long as it has not elapsed (step E1), in a first embodiment, two actions are triggered simultaneously:
a. the device D sends a U-turn detection request to the portable equipment SD (step E3a) via BLE; and
b. the at least one internal module I1, in this example, the two internal modules I1, I2, is/are activated in a "radar" mode in order to scan the passenger compartment and detect a possible human presence (step E3b). For this purpose, the internal modules transmit UWB waves and compare the profile of the waves reflected and received in return with predetermined profiles, with said profiles representing the presence or absence of a human in the passenger compartment.

The hands-free access portable equipment SD receives the U-turn detection request from the vehicle V via BLE. Said equipment SD then triggers the recording of the measurements of its gyroscope G values. The equipment SD can also increase its acquisition frequency of the measurements of the gyroscope G in order to more precisely detect a possible U-turn.

The values are processed by the internal processor 200, and a U-turn is detected if, within a predetermined time window Δt, the recording has a peak maximum value P1 and a peak minimum value P2, this is illustrated in FIG. 2, which shows the gyroscope values G measured according to time t.

If a U-turn is detected (step E4a), then the equipment returns a U-turn signal (step E5a) to the vehicle V via BLE.

Once the U-turn signal is received, the vehicle V stops scanning for presence inside the vehicle (step E6), and then uses all the internal and external modules Ex1, Ex2, Ex3, Ex4, I1, I2, (if only two modules are present on the vehicle, then the term: "all the modules" means said two modules that are present) in order to accurately determine the position of the user located outside the vehicle V (step E7). The internal modules I1, I2 therefore change from a "radar" mode to a ULB location mode where the position of the user is determined as a function of a triangulation of the signals received by the modules, and as a function of a time of flight of the signals or other methods that are known in the prior art.

Of course, if the vehicle is only equipped with one internal module I1 and one external module Ex1, this location of the user can only occur on one side of the vehicle V, for example, on the driver side of the vehicle.

If, once the time has elapsed, no U-turn is detected (step E4a) and no presence has been detected inside the vehicle, the vehicle then carries out the user presence detection function using all the modules (step E7), as explained above (step E7).

At the same time, and during the predetermined duration of 10 seconds, if presence is detected inside the vehicle V, (step E4b), the device D triggers a visual or audible warning (step E5b) to notify the user, for example, the activation of the horn or the turn lights of the vehicle V. Scanning is stopped (step E6), and the vehicle returns to a standard operating mode of locating the user by means of all the modules present on the vehicle V (step E7).

Similarly, if, once the time has elapsed, no U-turn is detected (step E4a) and no presence has been detected inside the vehicle, the vehicle carries out the user presence detection function using all the modules (step E7), as explained above.

In a second embodiment of the method of the invention, illustrated using dashed lines in FIG. 5, once the vehicle V is locked, in addition to triggering the scanning of the passenger compartment and in addition to asking the portable equipment SD to detect a possible U-turn of the user, the method comprises a step of determining the distance separating the user U from the vehicle V by using only the external modules Ex1, Ex2, Ex3, Ex4 (step E3c). Indeed, the external modules are not requested to carry out the scanning step, nor to carry out the U-turn detection step.

Said external modules Ex1, Ex2, Ex3, Ex4, by transceiving via ULB, thus allow a distance separating them from the portable equipment SD to be determined, this is known to a person skilled in the art (step E4c).

Thus, if the scanning device D receives a U-turn signal from the portable equipment SD, it can check that the distance values thus determined and stored in its memory and its processor represent a U-turn by the user, i.e., moving away and then returning to the vehicle V. Indeed, the distance values will increase when the user moves away, and then decrease if they perform a U-turn and returns to their vehicle V.

The U-turn detection carried out by the portable equipment SD thus can be checked by the scanning device D by virtue of its external modules.

If the distance variation Δd represents a U-turn (step E5c) and confirms the U-turn signal received from the portable equipment SD, then the scanning method stops (step E6) and the vehicle carries out the user presence detection function using all the modules (step E7), as explained above.

Figure 3:
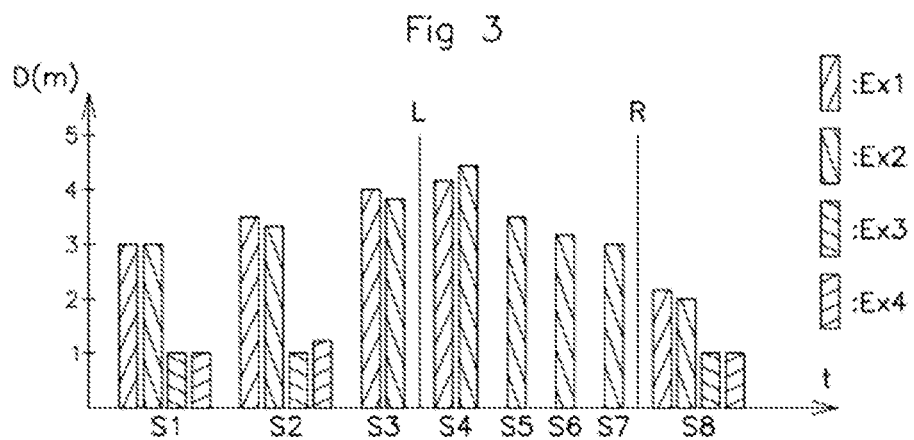
FIG. 3 is a graph showing the distances according to time between the portable hands-free access equipment and the vehicle following the trajectory illustrated in FIG. 4, and estimated by the various ULB transceivers located on the vehicle according to the scanning method according to an aspect of the invention.
Figure 4:
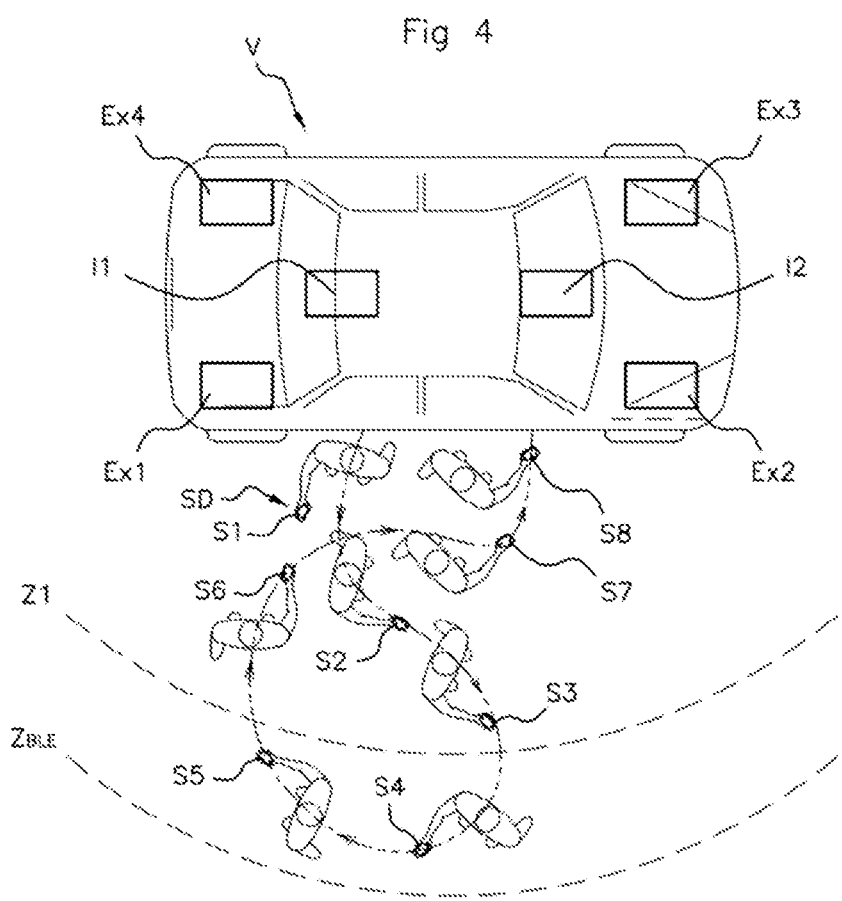
FIG. 4 schematically shows the trajectory of the user performing a U-turn and returning to their vehicle after having left it, and the various points on the trajectory, the corresponding distances of which are illustrated in the graph of FIG. 3.

This is illustrated in FIGS. 3 and 4. FIG. 4 shows eight positions, S1 to S8, of the user U relative to the vehicle V, with the user leaving the vehicle V and then performing a U-turn and then returning to the vehicle V.

The graph of FIG. 3 shows the distance of the user relative to the vehicle as a function of the signals received by the various modules Ex1, Ex2, Ex3, Ex4, I1, I2 for each of their positions and by applying the second embodiment of the scanning method according to the invention.

During the first phase PH1, all the internal I1, I2 and external Ex1 . . . . Ex4 modules are used to carry out the function for locating the portable equipment SD. The user is located outside the vehicle V, at points S1, S2, S3, and moves away from the vehicle V. The distance measured by the transmitters increases for all the transmitters, with a lower estimated distance for the internal modules (due to the attenuation in the passenger compartment), then the internal modules no longer "see" the user at position S3, the distance is then too great for said internal modules to receive a signal from the equipment.

From position S3, the user exits the unlocking zone Z1 of the vehicle, and the vehicle is then automatically locked, as indicated by event "L" in the graph of FIG. 3.

With the vehicle being locked, according to the second embodiment of the method according to the invention, the internal modules I1, I2 are then dedicated to scanning for presence in the passenger compartment while the external modules Ex1 . . . . Ex4 are dedicated to estimating the distance between the user and the vehicle. It can be seen that, during the second phase PH2, said distance decreases, with this corresponding to a U-turn of the user, illustrated by the positions S4, S5, S6, S7 in FIG. 4.

At the same time, the vehicle V receives a U-turn signal, which is sent from the portable equipment SD and which was detected by virtue of the processing of the measurements of its gyroscope G values. A U-turn is therefore confirmed, which is shown by the event "R3" in FIG. 3.

Once the U-turn has been detected, the scanning method stops and all the modules are used again in the third phase PH3 to detect the position of the user. The user is thus accurately detected as now being in position S8, in front of the door of their vehicle, and consequently the driver door can be automatically unlocked without the user U experiencing the wall effect as in the prior art.

An aspect of the invention is therefore ingenious since it allows simultaneous detection of the presence of a human inside the vehicle and detection of the position of the user outside the vehicle, without assigning a priority to one of the two functions, which would be to the detriment of the other function, and while respecting the 10 seconds stipulated by the standard.

By virtue of the invention, the user no longer runs the risk of being confronted with the wall effect, if they return to their vehicle, during the 10 seconds after locking their vehicle. In addition, the function of detecting presence in the passenger compartment, which is an essential function, is provided with a high degree of reliability.

The invention claimed is:

1. A method for scanning for presence inside a vehicle, using a scanning device comprising at least one internal ultra-wideband transceiver module capable of transmitting toward the inside of the vehicle and at least one external ultra-wideband transceiver module capable of transmitting toward the outside of the vehicle, and capable of locating portable "hands-free" access equipment carried by a user, said method being characterized in that the scanning device is previously equipped with Ultra High Frequency communication means for communicating with said equipment and in that the method comprising:
   a) detecting locking of the vehicle;
   b) for a predetermined duration:
      i) scanning for presence inside the vehicle using the internal ultra-wideband transceiver module, and comparing a profile of waves reflected and received by said internal module with at least one predetermined wave profile;
      ii) simultaneously transmitting, via Ultra High Frequency, a request to the portable equipment for detecting a U-turn by the user;
      iii) if a U-turn signal is received, stopping scanning and determining a position of the user using the internal module and the external module; and
      iv) if presence is detected inside the vehicle, then stopping scanning and transmitting a warning to the user; and
   c) otherwise, at the end of the predetermined duration, if no U-turn signal is received and if no presence is detected inside the vehicle, then determining the position of the user using the internal module and the external module.

2. The scanning method as claimed in claim 1, wherein if presence is detected inside the vehicle, then a signal to stop detecting a U-turn is transmitted to the portable equipment.

3. The scanning method as claimed in claim 1, the method further comprising:
   a) at the same time as scanning, a step of determining a distance between the user and the vehicle that is carried out by the external module;
   b) if a U-turn signal is received, a step of checking that values of said distance represent a U-turn; and
   c) scanning is only stopped and determining the position of the user is only carried out using the internal module and the external module if said check is confirmed.

4. A scanning device intended to be placed on board a motor vehicle comprising at least one internal ultra-wideband transceiver module capable of transmitting toward the inside of the vehicle and at least one external ultra-wideband transceiver module capable of transmitting toward the outside of the vehicle, and capable of locating portable "hands-free" access equipment carried by a user, the device being equipped with a clock and is capable of:
   a) communicating with said equipment using Ultra High Frequency;
   b) detecting the locking of the vehicle;
   c) scanning for presence inside the vehicle using the internal ultra-wide band wave transceiver module and comparing a profile of waves reflected and received by said module with at least one predetermined wave profile;
   d) simultaneously transmitting a request for detecting a U-turn of the user to said equipment;
   e) as a function of a U-turn signal received from the portable equipment or of the detection of presence inside the vehicle:
      (i) stopping scanning; and
      (ii) determining the position of the user using the internal module and the external module; and
   f) transmitting a warning to the user if presence is detected inside the vehicle.

5. The scanning device as claimed in claim 4, wherein the device is capable of sending a request to stop the measurements of a gyroscope to the portable equipment as a function of the detection of presence inside the vehicle.

6. A scanning device as claimed in claim 4, wherein the device is capable of:
   a) determining a distance between the user and the vehicle by the external module;
   b) checking, as a function of the U-turn signal, that the values of said distance correspond to a U-turn; and
   c) stopping scanning and determining the position of the user using the internal and external modules as a function of the result of the check.

7. A computer program product, comprising program code instructions for executing the steps of the scanning method as claimed in claim 1.

8. A motor vehicle, comprising a scanning device as claimed in claim 4.

9. A scanning device as claimed in claim 5, wherein the device is capable of:
   a) determining a distance between the user and the vehicle by the external module;
   b) checking, as a function of the U-turn signal, that the values of said distance correspond to a U-turn; and
   c) stopping scanning and determining the position of the user using the internal and external modules as a function of the result of the check.

* * * * *